United States Patent [19]

Kawakatsu

[11] Patent Number: 4,850,661
[45] Date of Patent: Jul. 25, 1989

[54] REFLECTION MIRROR FOR REFLECTING VISIBLE RAYS AND FOR TRANSMITTING INFRARED RAYS FROM LIGHT SOURCE

[75] Inventor: Akira Kawakatsu, Yokohama, Japan

[73] Assignee: Kabushiki Kaisha Toshiba, Kawasaki, Japan

[21] Appl. No.: 171,268

[22] Filed: Mar. 21, 1988

[30] Foreign Application Priority Data

Mar. 25, 1987 [JP] Japan ................... 62-68783

[51] Int. Cl.$^4$ ............................... G02B 5/26
[52] U.S. Cl. ..................... 350/1.6; 350/166
[58] Field of Search ................... 350/1.6, 166

[56] References Cited

FOREIGN PATENT DOCUMENTS 1248343  9/1971  United Kingdom .
1463939  2/1977  United Kingdom .

OTHER PUBLICATIONS

Schroeder, H. H. et al., "A Commercial Cold Reflector", *Journal of the SMPTE*, vol. 69, No. 5, May. 1960, pp. 351–354.

Primary Examiner—Bruce Y. Arnold
Attorney, Agent, or Firm—Oblon, Spivak, McClelland, Maier & Neustadt

[57] ABSTRACT

A reflection mirror includes a first interference filter layer arranged on one surface of a light permeable base for reflecting a large quantity of visible rays radiated from a light source and for transmitting a large quantity of infrared rays from the light source, a second interference filter layer arranged on the other surface of the base for transmitting a large amount of the infrared rays transmitting by the first intereference filter layer and for reflecting a large amount of the visible rays transmitted by the first interference filter layer toward the first interference filter layer. The infrared ray reflectance of the first interference filter layer is different from that of the second interference filter layer to increase the quantity of the infrared rays transmitted by the mirror through the second interference filter layer by a repeating reflection between the first and the second interference filter layers.

13 Claims, 3 Drawing Sheets

REFLECTION MIRROR FOR REFLECTING VISIBLE RAYS AND FOR TRANSMITTING INFRARED RAYS FROM LIGHT SOURCE

BACKGROUND OF THE INVENTION

1. Field of the invention

The present invention relates, in general, to reflection mirrors which reflect visible rays and transmit infrared rays from a light source. The above-described reflection mirror is generally used with a lamp, which may radiate a cool-light to such as displayed articles.

2. Description of the prior art

In conventional lamps including a reflection mirror, a glass base is disposed at the backside of the lamp. The inner surface of the glass base is provided with an interference filter for reflecting a large amount of visible rays and for transmitting a large quantity of infrared rays radiated from the lamp. Therefore, the lamp radiates the visible rays containing a small amount of infrared rays, as a cool-light. Such a reflection mirror is called a cold mirror.

The above-described interference filter includes a high refractive index layer made of titanium dioxide, and a low refractive index layer made of silica alternatively stacked one on the other for a total of ten or fifteen layers stocked on the glass base. The interference filter reflects light in a specific wavelength range and transmits light in another range by interference of the light. The reflection wavelength range and the transmition wavelength range are determined by the optical thickness of each reflective layer.

The interference filter with the above-described construction has a low light absorption factor over the entire wavelength range. However, the visible ray reflectance is low in this conventional reflection mirror because of one interference filter arranged on the inner surface of the glass base.

In a sound example of the reflection mirror, a pair of interference filters have the same characteristics one as the other, are respectively arranged on opposite surfaces of a glass base for improving the reflectance of the one example described above. The light transmitting through one interference filter which is disposed on the one surface of the glass base is reflected toward the one interference filter at a prescribed rate by the other interference filter disposed on the other surface of the glass base. Finally, the light transmits from each interference filter while the light reciprocates between interference filters by reflection. This phenomenon is referred to as a interference between the repeating reflection filters in this specification.

In the second example of the reflection mirror described above, the visible ray reflectance is improved. However, since infrared rays also are reflected by the interference filters by the repeating reflection, the infrared rays transmitting toward the lamp increases. Therefore, the infrared rays transmission factor is adversely affected.

SUMMARY OF THE INVENTION

It is an object of the present invention to increase the amount of the infrared rays transmitting from a reflection mirror.

To accomplish the above object, a reflection mirror includes a first interference filter having a prescribed infrared ray reflectance over a prescribed wavelength range for transmitting a large amount of infrared rays radiated from a light source and for reflecting a large amount of visible rays radiated from the light source, a second interference filter having a predetermined infrared ray reflectance over a prescribed wavelength range different from that of the first interference filter for transmitting a large amount of the infrared rays transmitting from the first interference filter and for reflecting a large amount of the visible rays transmitting from the first interference filter, and a base component for supporting the first and the second interference filters for causing a repeating reflection between the light reflecting from first and the second interference filters, thereby increasing the quantity of infrared rays transmitting from the mirror through the second interference filter.

The base component may include a light permeable base, on the opposite surfaces of which the first and the second interference filters are respectively arranged.

The first interference filter may include a refractive layer composed of a first refractive element and a second refractive element stacked on the first refractive element. The first refractive element has a prescribed refractive index and the second refractive element has a predetermined refractive index greater than that of the first refractive element.

The second interference filter may include a second refractive layer composed of a third refractive element and a fourth refractive element stacked on the third refractive element. The third refractive element has a prescribed refractive index and the fourth refractive element has a predetermined refractive index different from that of the third refractive element.

BRIEF DESCRIPTION OF THE DRAWINGS

These and other objects and advantages of this invention will become apparent from the following detailed description of the presently preferred embodiment of the invention, taken in conjunction with the accompanying drawings of which.

DETAILED DESCRIPTION OF THE PREFERRED EMBODIMENT

Figure 1:
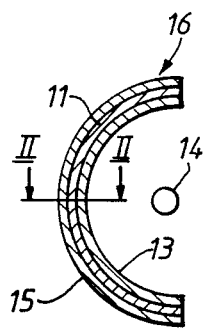
FIG. 1 is a side view illustrating a reflection mirror of one embodiment of the present invention with a light source.

The preferred embodiment of the present invention will now be described in more detail with reference to the accompanying drawings. As shown in FIG. 1, a light permeable base 11 made of quartz glass is formed in a semicylindrical shape having a radius of approximately 5-10 mm. A front side interference filter layer 13 is mounted on the inner surface of base 11. A rear side interference filter layer 15 is formed on the outer surface of base 11. Front and rear side interference filter layers 13 and 15 reflect visible rays and transmit infrared rays from a light source 14 disposed in front of the inner surface of base 11. The infrared rays reflectances of each interference filter layer 13, 15 are different from one the other. Therefore, a reflection mirror 16 which includes light permeable base 11 and interference filter layers 13 and 15 each disposed on opposite sides of base 11 reflects a light, including a large amount of visible rays and a small amount of infrared rays, radiated from light source 14.

Figure 2:
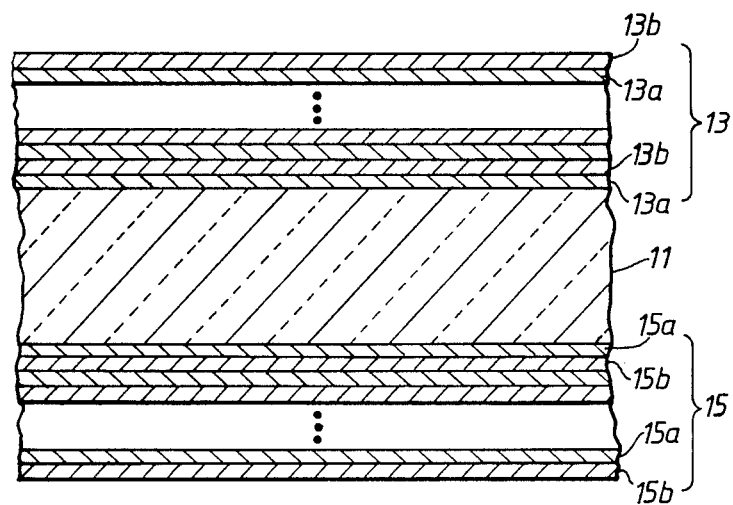
FIG. 2 is an enlarged schematic sectional view taken on line II—II of FIG. 1.

As shown in FIG. 2, front side interference filter layer 13 includes a high refractive index layer 13a made of titanium dioxide and a low refractive index layer 13b made of silica alternately accumulated one the other. In this case, fifteen layers of each refractive index layer 13a, 13b are accumulated alternately. Rear side interference filter layer 15 also includes a high refractive index layer 15a made of titanium dioxide and a low refractive index layer 15b made of silica alternately accumulated one the other. Each refractive index layer 15a, 15b also includes fifteen layers respectively. The thickness of each refractive index layer 13a, 13b is greater than that of each refractive index layer 15a, 15b by 10%. As a result, each reflectance of interference layers 13 and 14 is different from one the other.

Figure 3:
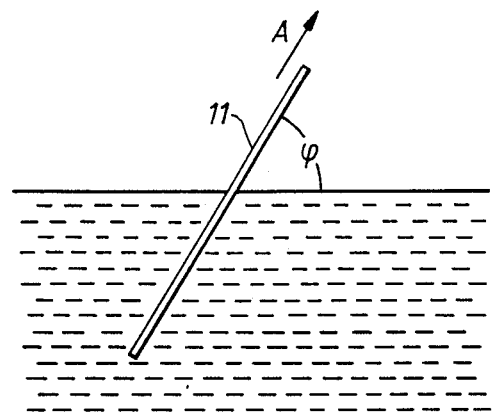
FIG. 3 is a schematic view showing a manufacturing process of a reflection mirror.
Figure 4:
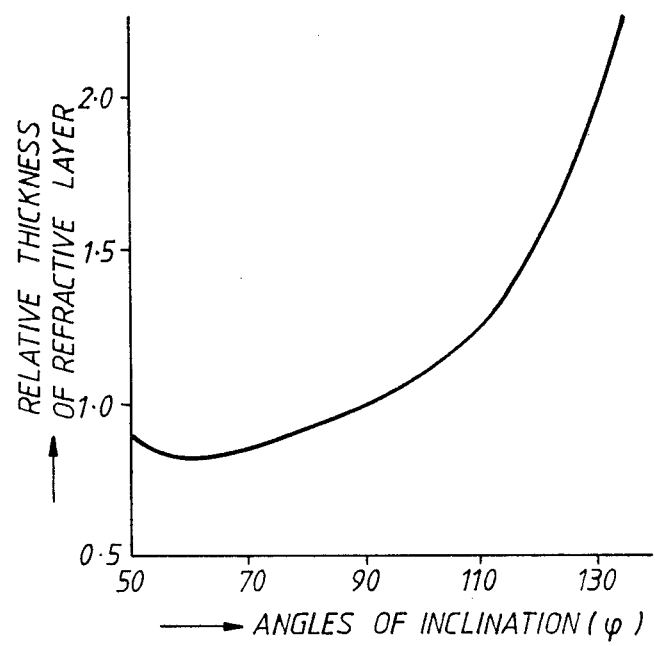
FIG. 4 is a diagram illustrating variations in the relative thickness of a refractive layer when the angle of the inclination φ shown in FIG. 3 is varied.

The above-described high and low refractive index layers 13 and 15 are formed by the following processes. In a first process, base 11 is dipped into a titanium liquid which includes an organotitanium compound, e.g., tetraisopropyl-titanate dissolved in a prescribed amount of an organic solvent, e.g., acetic ester. The titanium liquid has 2-10% wt of titanium, and the viscosity of approximately 1.0 CPS. Then, base 11 is drawn up from the titanium liquid at a prescribed speed. Thus, the titanium liquid is applied to the opposite surfaces of base 11 at a prescribed thickness. High refractive index layers 13a and 15a made of titanium dioxide are fixed on base 11 by baking base 11 for approximately five minutes at a prescribed high temperature in an oxidizing atmosphere, after drying base 11. In a second process, base 11 on which high refractive index layers 13a and 15a are formed is dipped into a silicone liquid which includes an organosilicic compound, e.g., ethylsilicate, dissolved in an organic solvent, e.g., acetic ester. The silicone liquid also has 2-10% wt of silicon, and the viscosity of approximately 1.0 CPS. Then, base 11 is drawn up from the silicone liquid at a prescribed speed. Thus, the silicone liquid is applied at a prescribed thickness to high refractive index layers 13a and 15a each disposed on the opposite surfaces of base 11. As described above, low refractive index layers 13b and 15b made of silica are also fixed on base 11 by baking base 11 for approximately five minutes at a prescribed high temperature in an oxidizing atmosphere, after drying base 11. Thus, low refractive index layers 13b and 15b are individually accumulated on the corresponding high refractive index layers 13a and 15a. A desirable number of individual layers 13 and 15 are formed on base 11 by executing the above-described first and second processes alternately, as shown in FIG. 2. It should be noted that the thickness of high refractive index layers 13a and 15a can be different from that of low refractive index layers 13b and 15b when the viscosity of the titanium liquid is different from that of the silicone liquid. In addition, the thickness of front side interference filter layer 13 including high and low refractive index layers 13a and 13b can be different from that of rear side interference filter layer 15 including high and low refractive index layers 15a and 15b when base 11 is drawn up from the titanium liquid or silicone liquid in an inclined direction indicated by an arrow A in FIG. 3. In this case, the thickness of the layer on the upper side surface of base 11 is greater than that of the layer on the lower side surface of base 11. The relationship between the angles of the inclination $\phi$ and the relative layer thickness, i.e., the ratio of the thickness between respective interference filter layers of the upper side and the lower side surfaces of base 11, is shown in FIG. 4.

Regarding the above-described reflection mirror, the consideration will be described hereafter when the reflectance of front and rear side interference filter layers 13 and 15 of the reflection mirror is different from one another.

The transmission factor T of a reflection mirror is expressed by the following equation when the repeating reflection of the light within base 11 between front and rear side interference filter layers 13 and 15 is taken into consideration:

$$T = \frac{(1-R)(1-R')}{1-RR'} \tag{1}$$

Wherein R is the reflectance of the front side interference filter layer, and R' is the reflectance of the rear side interference filter layer.

In the above-described equation (1), the transmission factor $T_1$ of the conventional reflection mirror is expressed by the following equation (2) based on the equation (1) when the reflectances R and R' of front and rear side interference layers are equal to one the other:

$$T_1 = \frac{1-R}{1+R} \tag{2}$$

The transmission factor $T_2$ of the improved reflection mirror also is expressed by the following equation (3) in accordance with the equation (1) when the reflectance R' of the rear side interference layer is expressed as KR (K: constant):

$$T_2 = \frac{(1-R)(1-KR)}{1-KR^2} \tag{3}$$

Therefore, the difference between transmission factors $T_1$ and $T_2$ is expressed by the following equation (4):

$$T_2 - T_1 = \frac{R(1-R)}{1+R} \times \frac{1-K}{1-KR^2} \tag{4}$$

According to the equation (4), the transmission factor $T_2$ of the improved reflection mirror is greater than the transmission factor $T_1$ of the conventional reflection mirror when the constant K is equal to or less than one.

Also, the transmission factor $T_2$ of the improved reflection mirror is greater than the transmission factor $T_1$ of the conventional reflection mirror when the following conditions are satisfied:

$$K>1 \text{ and } R \leq 1/\sqrt{K}$$

In addition, reflectance R and R' of front and rear side interference layers are averaged when the difference between reflectances R and R' of front and rear side interference layers is extremely large, and the following conditions are satisfied:

$$K>1 \text{ and } R \leq 1/\sqrt{K}$$

Figure 5:
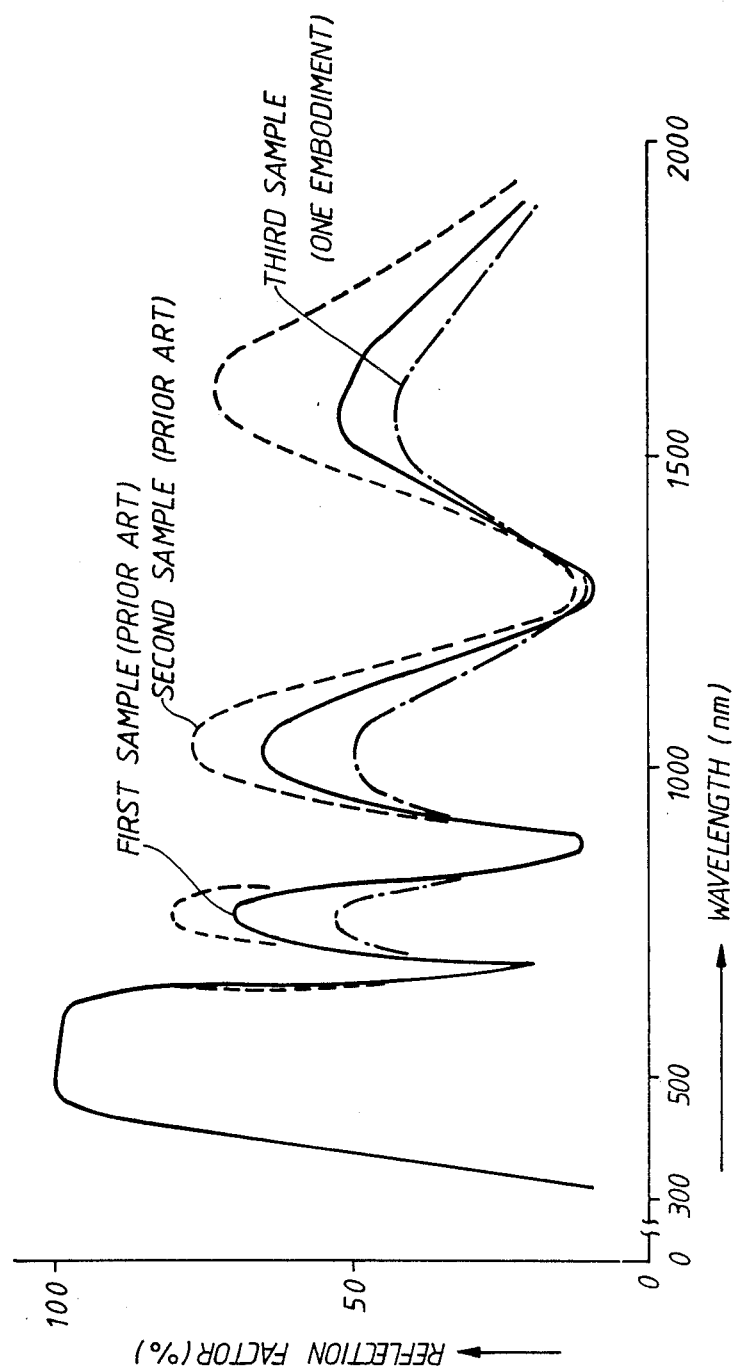
FIG. 5 is a diagram illustrating variations in each reflectance of three different samples of a reflection mirror against each wavelength.

FIG. 5 shows each spectral reflectance of three different samples. The first sample (one prior art device) is constructed such that the interference filter layer is formed on the front surface of the base. The second sample (another prior art device) is constructed such that the interference filter layers are individually formed on opposite sides of the base. The third sample is the one embodiment described above. The number of high and low refractive index layers of each interference filter layer of the above described samples is equal to one another. The transition of the spectral reflectance of the first sample is indicated by a solid line. The transition of the spectral reflectance of the second sample also is indicated by a dotted line, and the transition of the spectral reflectance of the third sample is indicated by a dash and dotted line.

As can be understood from FIG. 5, the reflectance of each of the above-described samples is almost equal to one another in a visible ray area when the wavelength less than 700 nm is considered as a visible ray area. In an infrared ray area, three different positive peaks and three different negative peaks of reflectance of each sample exist. Each negative peak of reflectance of the third sample is almost equal to that of the first and second samples. However, each positive peak of reflectance of the third sample is lower than that of the first and second samples. In other words, the infrared ray transmission factor of the third sample (one embodiment) is greater than that of the first and second samples. This is because the repeating reflection in the base between the interference filter layers each disposed on opposite sides of the base occurs due to the difference in the optical thickness between the interference filter layers in the third sample. When each optical thickness of the interference filter layers is different, each reflectance factor of the interference filter layers is different. As can be seen in FIG. 5, the reflectance of the third sample does not decrease in the visible ray area compared with the first and the second samples. This is because the influence of the difference in the optical thickness on reflectance increases, as the wavelength of a light is longer.

Accordingly, in the above-described embodiment of the present invention, since the light absorption factor of the interference filter layer is extremely small (substantially zero), the infrared ray transmission factor increases, and the visible ray reflectance does not decrease in spite of the existance of the interference filter layers respectively arranged on the opposite sides of the base.

In the above-described embodiment, the base is made of quartz glass, and is formed in a semicylindrical shape. However, the base may be made of hard glass, soft glass or crystallized glass. The base may be formed in a cylindrical shape, or a plate shape, which depends on the structure to which the mirror is applied. Furthermore, the thickness of the rear side interference filter layer is greater than that of the front side interference filter layer in the embodiment described above. However, the thickness of the front side interference filter layer may be greater than that of the rear side interference filter layer. In this case, the infrared ray transmission factor of the reflection mirror is set to an averaged value of each reflectance of the interference filter layers by the repeating reflection, and thus, the infrared ray transmission factor of the reflection mirror may be improved.

The present invention has been described with respect to a specific embodiment. However, other embodiments based on the principles of the present invention should be obvious to those of ordinary skill in the art. Such embodiments are intended to be covered by the claims.

What is claimed is:

1. A reflection mirror which reflects visible rays and transmits infrared rays of light radiated from a light source, the reflection mirror comprising:
    first interference filter means for reflecting a large quantity of the visible rays and a portion of the infrared rays at a first infrared ray reflectance over a prescribed wavelength range, the first interference filter means transmitting a large amount of the infrared rays and a portion of the visible rays;
    second interference filter means for transmitting a large amount of the infrared rays and a portion of the visible rays transmitted by the first interference filter means, the second interference filter means reflecting a large quantity of the visible rays and a portion of the infrared rays transmitted by the first interference filter means toward the first interference filter means at a second infrared ray reflectance different than the first reflectance of the first interference filter means; and
    base means having a prescribed thickness for supporting the first and the second interference filter means at opposite surfaces thereof for causing a repeating reflection of the light in the base means between the first and the second interference filter means.

2. A reflection mirror according to claim 1, wherein the first interference filter means includes a refractive layer having a first refractive element and a second refractive element stacked on the first refractive element, the first refractive element having a first refractive index and the second refractive element having a second refractive index greater than the first refractive index.

3. A reflection mirror according to claim 2, wherein the second interference filter means includes a second refractive layer having a third refractive element and a fourth refractive element stacked on the third refractive element, the third refractive element having a third refractive index and the fourth refractive element having a fourth refractive index greater than the third refractive index, the infrared ray reflectance of the first interference filter means being greater than that of the second interference filter means.

4. A reflection mirror according to claim 3, wherein the third refractive element includes silica and the forth refractive element includes titanium oxide.

5. A reflection mirror according to claim 2, wherein the second interference filter means includes a second refractive layer having a third refractive element and a fourth refractive element stacked on the third refractive element, the third refractive element having a third refractive index and the fourth refractive element having a predetermined refractive index greater than the third refractive index, the infrared ray reflectance of the second interference filter means being greater than that of the first interference filter means.

6. A reflection mirror according to claim 2, wherein the first refractive element includes silica and the second refractive element includes titanium oxide.

7. A reflection mirror according to claim 2, wherein the second refractive layer includes a third refractive element having a third refractive index and a fourth refractive element having a fourth refractive index greater than the third refractive index, the fourth refractive element being stacked on the third refractive element.

8. A reflection mirror according to claim 7, wherein the third refractive element includes silica, and the fourth refractive element includes titanium oxide.

9. A reflection mirror which reflects visible rays and transmits infrared rays of light radiated from a light source, comprising:
- first interference filter means including a first refractive layer of a prescribed optical thickness for reflecting a large amount of the visible rays and a portion of the infrared rays, the first interference filter means transmitted a large amount of the infrared rays and a portion of the visible rays;
- second interference filter means for transmitting a large amount of the infrared rays and a portion of the visible rays transmitted by the first interference filter means, the second interference filter means reflecting a large amount of the visible rays and a portion of the infrared rays transmitted by the first interference filter means toward the first interference filter means, the second interference filter means having a second refractive layer of a predetermined optical thickness different from that of the first refractive layer; and
- base means for supporting the first and the second interference filter means for causing a repeating reflection of the light between the first and the second interference filter means.

10. A reflection mirror according to claim 9, wherein the base means includes a light permeable base having opposite surfaces, the first and the second refractive layers being arranged on opposite surfaces of the base respectively.

11. A reflection mirror according to claim 10, wherein the first refractive layer includes a first refractive element having a first refractive index and a second refractive element having a second refractive index greater than the first refractive index, the second refractive element being stacked on the first refractive element.

12. A reflection mirror according to claim 11, wherein the first refractive element includes silica, and the second refractive element includes titanium oxide.

13. A lamp device comprising:
- a light source means for producing light having visible rays and infrared rays; and
- a reflection mirror disposed opposite to the light source means, including:
  - first interference filter means for reflecting a large quantity of the visible rays and a portion of the infrared rays of light radiated from the light source at a first infrared ray reflectance, the first interference filter means transmitting a large amount of the infrared rays and a portion of the visible rays radiated from the light source,
  - second interference filter means for transmitting a large amount of the infrared rays and a portion of the visible rays transmitted by the first interference filter means, the second interference filter means reflecting a large quantity of the visible rays and a portion of the infrared rays transmitted by the first interference filter means toward the first interference filter means at a second infrared ray reflectance different from the first infrared reflectance of the first interference filter means, and
- base means for supporting the first and the second interference filter means for causing a repeating reflection of the light between the first and the second interference filter means.

* * * * *